United States Patent
Mattes et al.

(10) Patent No.: US 7,529,620 B2
(45) Date of Patent: May 5, 2009

(54) SENSOR ARRANGEMENT FOR THE DETECTION OF COLLISIONS

(75) Inventors: Bernhard Mattes, Sachsenheim (DE); Siegfried Malicki, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 10/545,250

(22) PCT Filed: Oct. 18, 2003

(86) PCT No.: PCT/DE03/03501

§ 371 (c)(1),
(2), (4) Date: Jul. 12, 2006

(87) PCT Pub. No.: WO2004/076241

PCT Pub. Date: Sep. 10, 2004

(65) Prior Publication Data

US 2006/0265130 A1    Nov. 23, 2006

(30) Foreign Application Priority Data

Feb. 24, 2003    (DE) .............................. 103 07 745

(51) Int. Cl.
    *G08G 1/16*    (2006.01)
(52) U.S. Cl. .................. 701/301; 701/96; 180/272; 280/734; 280/735; 340/436; 340/903
(58) Field of Classification Search .................. 701/45, 701/46, 36, 301; 280/734, 735; 180/282; 340/435, 436, 903
See application file for complete search history.

(56) References Cited

U.S. PATENT DOCUMENTS

2002/0156561 A1    10/2002    DeBoni ....................... 701/48
2003/0114973 A1*    6/2003    Takagi et al. ................. 701/45

FOREIGN PATENT DOCUMENTS

| DE | 196 09 290 | 4/1997 |
| DE | 100 17 084 | 8/2001 |
| DE | 101 34 331 | 10/2002 |
| EP | 1 306 269 | 5/2003 |

OTHER PUBLICATIONS

Kosiak W. K. et al.: "Future Trends In Restraint Systems Electronics", *Automotive Engineering International, SAE International, US*, Bd. 107, Nr. 9, (Sep. 1999), pp. 1-6, XP000860904, ISSN: 0098-2571.

* cited by examiner

*Primary Examiner*—Gertrude Arthur Jeanglaud
(74) *Attorney, Agent, or Firm*—Kenyon & Kenyon LLP

(57) ABSTRACT

A sensor system for impact detection is situated in the front region of the vehicle. The sensor system is able to detect kinematic variables in both the longitudinal and vertical directions of the vehicle. The sensor system is suited in particular for truck underride crashes.

17 Claims, 3 Drawing Sheets

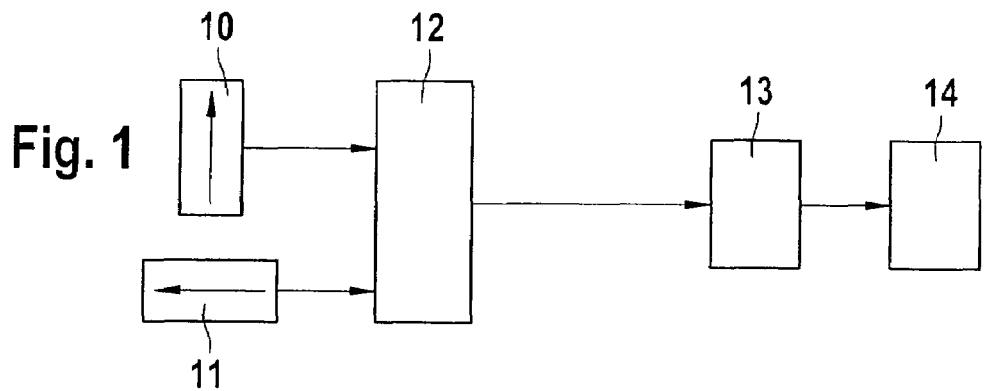
Fig. 1
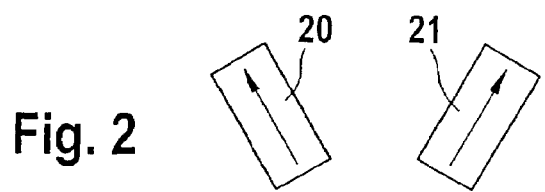
Fig. 2
Fig. 3
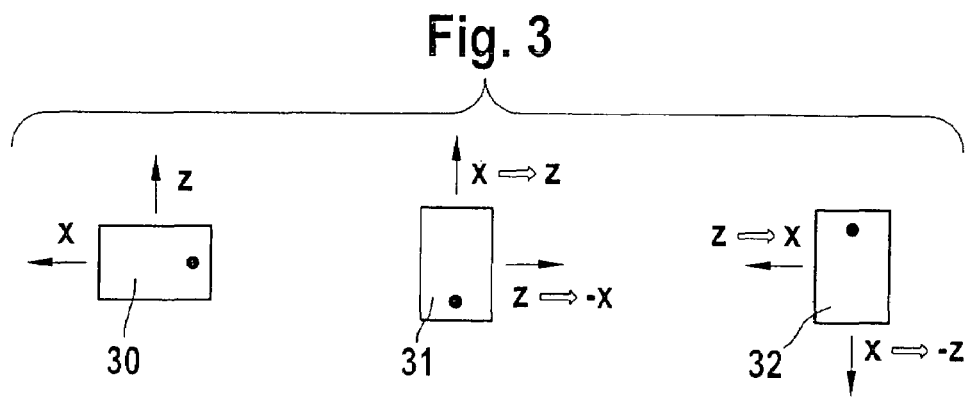

SENSOR ARRANGEMENT FOR THE DETECTION OF COLLISIONS

FIELD OF THE INVENTION

The present invention relates to a sensor system for impact detection.

BACKGROUND INFORMATION

The use of external sensors in a restraint system for impact detection has been described in German Patent Publication No. 196 09 290.

Upfront sensors currently in use are acceleration sensors installed in the front deformation zone of the vehicle, i.e., on the radiator crossmember, which detect only in the longitudinal direction of the vehicle. It is possible for the acceleration sensors to be able to detect in the Y direction as well, for example for detecting the crash direction. The upfront sensors are basically used for improved detection of frontal problem crashes such as oblique impacts, truck underride crashes, and impacts on soft obstructions, for example, collisions with large animals such as moose, horses, or cattle.

In truck underride crashes, which carry a high risk of injuries and are centrally detectable much too late, and in which the upfront sensors are actually intended to enable timely deployment, it happens in currently used upfront sensors and sensor configurations, i.e., sensor systems, that the less mechanically stable radiator crossmember is bent upward or downward, depending on the height of the impact object, before the impact is detected. As used here, "impact object" refers to the rear part of a truck, i.e., the truck trailer underride protection, the truck trailer longitudinal chassis beam, the truck trailer hitch, or the bottom edge of the flatbed truck. The impact vehicle longitudinal chassis beams enter under these objects. This is why these crashes are so hazardous and are centrally detectable so late.

The upfront sensors which are sensitive only in the X direction are disoriented by the impact and, depending on the impact combination, are able to detect only a larger or smaller portion of the deceleration component in the X direction. Unfortunately, there have been several cases in truck underride crashes in which the occupant protection system did not deploy, or deployed too late, because of disoriented upfront sensors and the occupants were injured.

SUMMARY OF THE INVENTION

The sensor system for impact detection according to the present invention has the advantage over the related art that a sensor system for front end impact detection is provided which has a sensor system that is able to detect kinematic variables in both the longitudinal direction and the vertical, i.e., Z direction of the vehicle. This is particularly advantageous for truck underride crashes, in which such external sensors, generally referred to as upfront sensors, are intended to allow timely deployment of restraining means. In particular, it may happen that the parts of the chassis on which the upfront sensors are mounted are bent during the crash, so that the upfront sensors are no longer oriented in the longitudinal direction of the vehicle. Rather, it is expected that the upfront sensors then become oriented upward or downward approximately in the vertical direction.

Therefore, the present invention provides for the use of sensors which detect kinematic variables in the vertical direction of the vehicle as well, so that it is then possible to detect kinematic variables in the longitudinal direction of the vehicle even if there is bending. Upfront sensors which are sensitive only in the longitudinal direction, and thus the X direction, of the vehicle become disoriented by such an impact, and, depending on the impact combination, are able to detect only a larger or smaller portion of the X component of the deceleration. The simplest embodiment, therefore, is to provide acceleration sensors in the X and Z directions as upfront sensors. However, it is also possible to use acceleration sensors situated at an angle to the X and Z directions so that the crash direction may also be detected by, for example, multiple such obliquely situated acceleration sensors. An additional Y sensor may also be used here for detecting the crash direction as well as for plausibility checking.

It is particularly advantageous to provide acceleration sensors to detect the kinematic variables, and thus in this case, the acceleration in both the longitudinal and vertical directions of the vehicle. As described above, the acceleration sensors may be oriented directly in the longitudinal or the vertical direction of the vehicle, and also at an angle thereto, for example at 45°. Other sensors which are able to detect such kinematic variables in an impact may also be used here.

The first and second acceleration sensors are advantageously mounted in a common housing. This economizes on cable length and simplifies installation of the sensor system. Alternatively, however, the acceleration sensors may also be mounted in separate housings. This may result in simplification.

The sensor-system is connected to a control unit for restraint systems so that, based on the signals from the first and second acceleration sensors, the control unit is able to detect which sensor is oriented in the longitudinal or in the vertical direction of the vehicle, or at an angle thereto. The control unit detects this by virtue of which sensor sends the signal having the higher absolute value. In an impact, a longitudinal component of the vehicle sends a stronger signal than does a vertical component of the vehicle. As a result, in such an impact the sensor oriented most closely to the longitudinal direction of the vehicle sends the stronger signal, even when the radiator is bent. The sensor system may be situated on the upper crossmember of the radiator. It may be provided that pairs of such first and second acceleration sensors are situated on both the left and right side of the radiator crossmember, or that only a single pair is centrally situated on the radiator crossmember.

BRIEF DESCRIPTION OF THE DRAWINGS

FIG. 1 shows a block diagram of the sensor system according to an embodiment of the present invention.

FIG. 2 shows an alternative configuration of the acceleration sensors according to an embodiment of the present invention.

FIG. 3 shows a rotation of the sensors during a crash.

DETAILED DESCRIPTION

Figure 4:
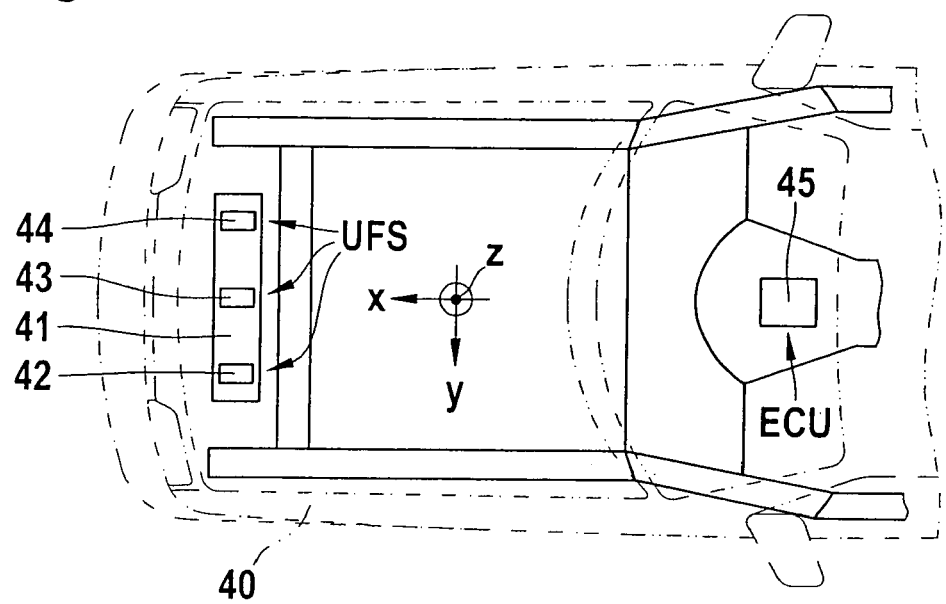
FIG. 4 shows a schematic illustration of the installation site for the upfront sensors.

According to the present invention, a sensor system is situated in the front of the vehicle and is configured in such a way that the kinematic variables may be detected in both the longitudinal and vertical directions of the vehicle. For this reason there is an upfront sensor which is provided with acceleration sensors generally having two channels, thus, in the X and Z directions. The sensor system may also be configured in such a way that also the accelerations in the transverse direction of the vehicle and/or other kinematic variables are detectable. The crash direction may also be easily identified in this manner.

In a normal crash, i.e., one in which the radiator crossmember is not bent upward or downward before deployment, the acceleration sensor in the upfront sensor, and thus in the sensor system, which is sensitive in the X direction detects the problem crash. This is an example in which the strongest acceleration signal in the X direction is used in the deployment algorithm for integration. Although the sensors in the sensor system which are sensitive in the Z direction detect the Z components of the acceleration, which are present in every crash, these components are much smaller than the X components of the acceleration and have only secondary relevance for specifying the time of deployment. The sensors which are sensitive in the Z direction could be used for plausibility checking. Furthermore, the information about the Z direction may also be advantageously used for impact detection or impact discrimination.

If radiator crossmembers are deformed before the deployment, which may occur in severe problem crashes in which the upfront sensors which are sensitive only in the X direction have already failed multiple times, the X sensors no longer detect the X components of the acceleration, or detect these components only partially, because these sensors are now oriented more or less in the direction of the Z axis. If the radiator crossmember and thus the upfront sensors are rotated upward, the original X sensors detect in the Z direction, and the Z sensors provided according to the present invention detect in the X direction. For a downward rotation, the original X sensors detect in the Z direction, and the original Z sensors detect in the X direction. Corresponding equivalents, in which the Z sensors are oriented in the Z direction and/or the X sensors are oriented in the X direction from the outset, may be implemented as well.

FIG. 3 shows exemplary sequences in the case of rotation of the sensor system. System 30 is still correctly oriented, and the acceleration sensors detect in the X and Z directions. System 31 has now been rotated upward, so that the original X sensor detects in the Z direction and the original Z sensor detects in the X direction. System 32 has been rotated downward, and here the original Z sensor detects in the X direction and the original X sensor detects in the Z direction. These are ideal cases; in the normal case the sensors are situated at an angle to the coordinate system, even with a rotation, so that this must be taken into account in the evaluation.

A bent radiator crossmember, and thus a rotation of the sensor system, is recognized by the fact that in a crash the original Z sensors detect the signal having the higher absolute value, and the original X sensors detect the signal having the lower absolute value. It is thus recognized that an impact has occurred, which for an occupant protection system having exclusively central detection represents a problem crash. In these cases, an algorithm for forming the deployment decision may either be set to a default parameter setting, or the Z signals are used for specifying the time of deployment.

Consequently, a crash may be satisfactorily detected even by rotated sensor systems and actually disoriented sensors, and protection may thus be provided for the occupants. This represents a significant improvement in occupant safety.

FIG. 1 shows in a block diagram one example embodiment of the system according to the present invention. A sensor 10 oriented in the Z direction as an acceleration sensor is connected to a first data input of a sensor signal processor 12. An acceleration sensor 11 oriented in the X direction is connected to a second data input of sensor data processor 12. Sensor data processor 12 is connected via a unidirectionally or bidirectionally configured data transmission line to a control unit 13 for restraint systems. Control unit 13 is in turn connected to restraining means 14 such as airbags, seat belt tensioners, or roll bars.

Upfront sensors 10 and 11 for sensor data evaluation unit 12, which also has a transmission component for transmitting the previously digitized and processed data to control unit 13, are used for impact detection. Alternatively, it is also possible to orient sensors in the Y direction for better detection of the crash direction. Control unit 13 evaluates the signals, and as a function of these signals influences the deployment algorithm and thus the decision to deploy restraining means 14, and also evaluates other appropriate data such as occupant detection and additional sensor data from other sensors situated, for example, in control unit 13 itself, for example for plausibility checking of the signals from sensors 10 and 11. Sensors 10 and 11 as well as sensor data evaluation unit 12 may be mounted in a common housing. However, sensors 10 and 11 may be situated in separate housings with separate sensor data evaluation units. The data transmission here is strictly unidirectional from sensor data evaluation unit 12 to control unit 13. This simplifies the design and thus saves on costs. Alternatively, this connection may have a bidirectional design, or may be joined to a bus connection.

FIG. 2 shows that sensors 10 and 11 may each be simulated by obliquely situated sensors 20 and 21. This enables improved detection of the crash direction. If both sensors 10 and 11 were replaced by such sensors 20 and 21, four sensors would be present.

FIG. 4 shows exemplary installation sites for the sensor system according to the present invention. Here the installation sites for the sensor system according to the present invention are illustrated on a radiator crossmember 41 of a vehicle 40, in the front region of the vehicle. The sensor system is situated either centrally at location 43 or on both left and right sides at locations 42 and 44. Regardless of where it is installed, the sensor system according to the present invention is then connected to a centrally situated control unit 45.

Figure 5:
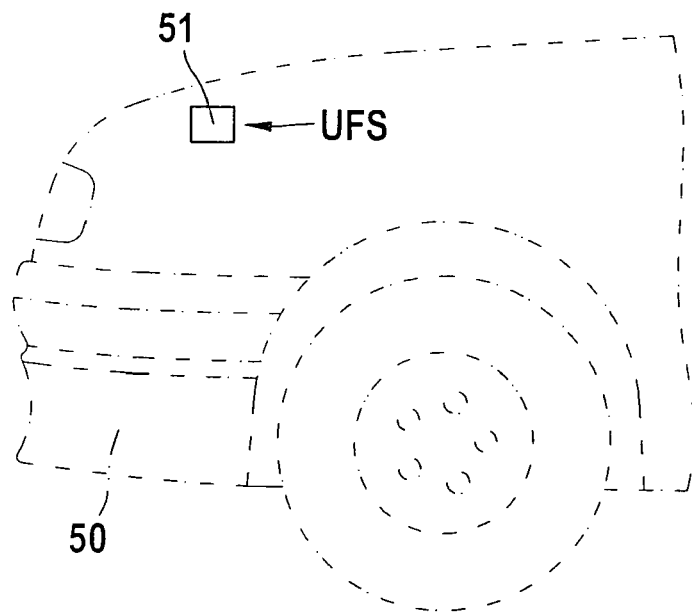
FIG. 5 shows another schematic illustration of the installation site for the sensors.

FIG. 5 shows in an additional schematic illustration the installation site for the sensor system according to the present invention. Sensor system 51 is installed in vehicle 50 very high up on the radiator crossmember.

Figure 6:
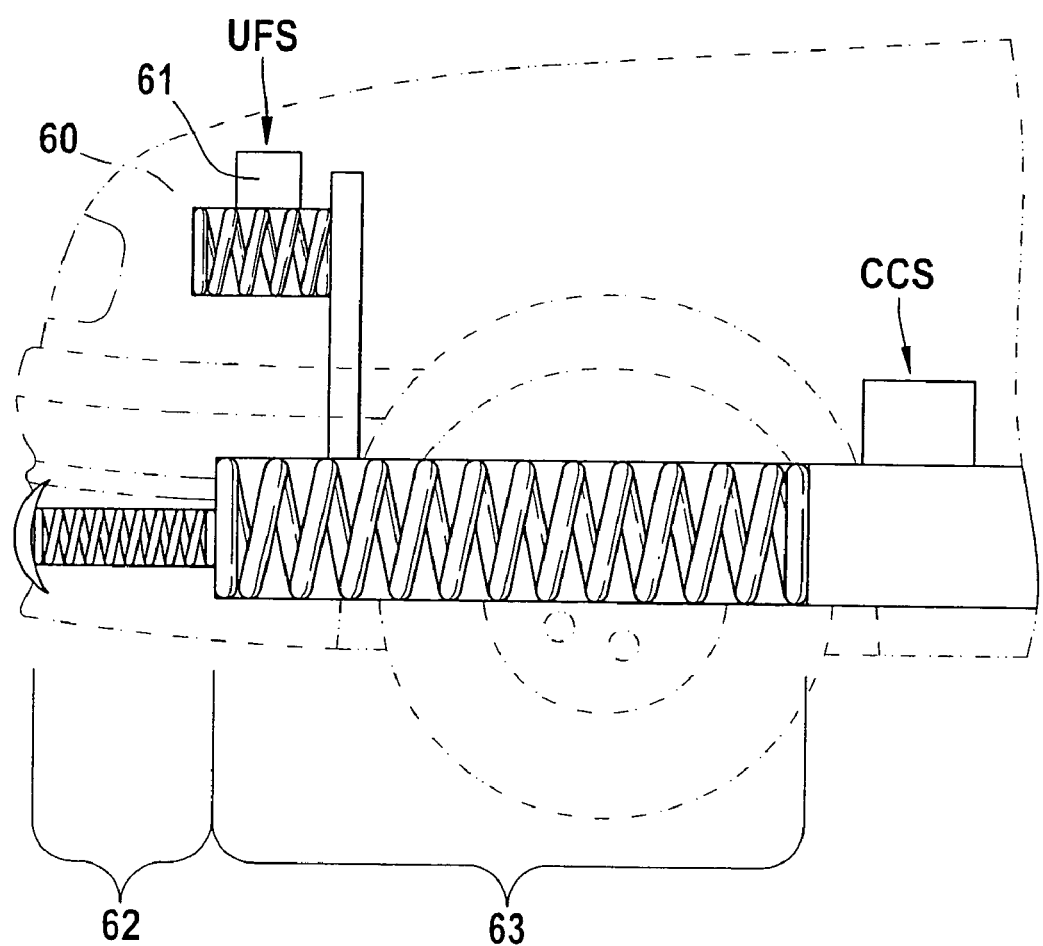
FIG. 6 shows a model of the deformation zone and the installation site for the upfront sensors.

FIG. 6 shows in a schematic illustration the location of inventive sensor system 61 in a vehicle 60 in relation to the crash zone. In a vehicle, a distinction is made between a deformation zone 62, which is deformed at low speeds, and a deformation zone 63, which is deformed only at high speeds, between the impact object and the vehicle. Sensor system 61 according to the present invention is situated in the transition zone between the deformation zone for low speeds and the deformation zone for high speeds. This is very advantageous for the operating mode of the sensor system. A typical acceleration sensor has a measuring range of ±220 g and a sensitivity of 9 mV per g. The acceleration sensor has self-testing capabilities and is easily mounted in a plastic housing.

What is claimed is:

1. A sensor system situated near a body surface of a vehicle for impact detection, comprising:
   at least one acceleration sensor situated in a front region of the vehicle, wherein the at least one acceleration sensor detects an acceleration in both a longitudinal direction of the vehicle and a vertical direction of the vehicle, wherein the at least one acceleration sensor is coupled to a control unit, wherein the control unit is coupled to an occupant protection system, wherein the occupant protection system takes into account a longitudinal acceleration value, wherein the control unit determines the absolute value of the acceleration in both the longitudinal direction of the vehicle and the vertical direction of the vehicle, and wherein the control unit outputs the greater of the absolute values to the occupant protection system as the longitudinal acceleration value.

2. The sensor system of claim 1, wherein the at least one acceleration sensor includes at least one first acceleration sensor for detecting an acceleration in the longitudinal direction of the vehicle and at least one second acceleration sensor for detecting an acceleration in the vertical direction of the vehicle.

3. The sensor system of claim 2, wherein the at least one first and the at least one second acceleration sensors are situated in a common housing.

4. The sensor system of claim 2, wherein the control unit detects whether the at least one first and the at least one second acceleration sensors have been rotated from their original position, based on signals from the at least one first and the at least one second acceleration sensors.

5. The sensor system of claim 1, wherein the at least one sensor is situated on an upper cross-member of a radiator in the front region of the vehicle.

6. The sensor system of claim 2, wherein the at least one first acceleration sensor and the at least one second acceleration sensor are centrally situated in the front of the vehicle.

7. The sensor system of claim 2, wherein the at least one first acceleration sensor includes a first pair of sensors and the at least one second acceleration sensor includes a second pair of sensors, the first pair being situated on a left side and the second pair being situated on a right side in the front region of the vehicle.

8. The sensor system of claim 1, wherein the at least one acceleration sensor is configured to additionally detect an acceleration in a transverse direction of the vehicle.

9. A method for detecting impact to a vehicle, comprising:
situating at least one acceleration sensor in the front region of the vehicle, wherein the at least one acceleration sensor is configured to detect an acceleration in both a longitudinal direction of the vehicle and a vertical direction of the vehicle;
detecting an acceleration in each of the configured directions;
determining absolute values of the detected accelerations;
determining the greater of the absolute values;
outputting the greater of the absolute values to an occupant protection system as a longitudinal acceleration value, wherein the occupant protection system takes as an input a longitudinal acceleration value.

10. The method of claim 9, further comprising:
determining whether the at least one acceleration sensor has been rotated from its original position, based on signals from the at least one acceleration sensor.

11. The method of claim 9, wherein the at least one acceleration sensor includes at least one first acceleration sensor for detecting an acceleration in the longitudinal direction of the vehicle and at least one second acceleration sensor for detecting an acceleration in the vertical direction of the vehicle.

12. The method of claim 11, wherein the at least one first and the at least one second acceleration sensors are situated in a common housing.

13. The method of claim 11, wherein a control unit detects whether the at least one first and the at least one second acceleration sensors have been rotated from their original position, based on signals from the at least one first and the at least one second acceleration sensors.

14. The method of claim 9, wherein the at least one sensor is situated on an upper cross-member of a radiator in the front region of the vehicle.

15. The method of claim 11, wherein the at least one first acceleration sensor and the at least one second acceleration sensor are centrally situated in the front of the vehicle.

16. The method of claim 11, wherein the at least one first acceleration sensor includes a first pair of sensors and the at least one second acceleration sensor includes a second pair of sensors, the first pair being situated on a left side and the second pair being situated on a right side in the front region of the vehicle.

17. The method of claim 9, wherein the at least one acceleration sensor is configured to additionally detect an acceleration in a transverse direction of the vehicle.

* * * * *